(12) United States Patent
Røsten et al.

(10) Patent No.: US 7,664,603 B2
(45) Date of Patent: Feb. 16, 2010

(54) ELECTROMAGNETIC WAVEFIELD ANALYSIS

(75) Inventors: Tage Røsten, Trondheim (NO); Lasse Amundsen, Trondheim (NO)

(73) Assignee: Statoil ASA, Stavanger (NO)

(*) Notice: Subject to any disclaimer, the term of this patent is extended or adjusted under 35 U.S.C. 154(b) by 125 days.

(21) Appl. No.: 11/547,379

(22) PCT Filed: Apr. 1, 2005

(86) PCT No.: PCT/EP2005/051484

§ 371 (c)(1),
(2), (4) Date: Nov. 16, 2006

(87) PCT Pub. No.: WO2005/096021

PCT Pub. Date: Oct. 13, 2005

(65) Prior Publication Data

US 2007/0247163 A1 Oct. 25, 2007

(30) Foreign Application Priority Data

Apr. 3, 2004 (GB) .................... 0407696.4

(51) Int. Cl.
*G01V 1/28* (2006.01)
*G01V 3/08* (2006.01)

(52) U.S. Cl. ........................... 702/17; 324/337

(58) Field of Classification Search .......... 702/2, 702/7, 17; 324/323, 337, 344; 378/87
See application file for complete search history.

(56) References Cited

U.S. PATENT DOCUMENTS

| 4,094,304 | A | | 6/1978 | Wright, Jr. | |
|---|---|---|---|---|---|
| 6,005,916 | A | * | 12/1999 | Johnson et al. | 378/87 |
| 6,415,231 | B1 | | 7/2002 | Herbert | |
| 7,319,330 | B2 | * | 1/2008 | Amundsen | 324/337 |
| 2008/0221795 | A1 | | 9/2008 | Amundsen et al. | |

FOREIGN PATENT DOCUMENTS

| GB | 2 296 567 A | 7/1996 |
|---|---|---|
| GB | 2 333 364 A | 7/1999 |
| GB | 2 385 923 A | 9/2003 |
| WO | WO 03/036331 A1 | 5/2003 |
| WO | WO 03/100467 A1 | 12/2003 |

OTHER PUBLICATIONS

Amundsen et al. (GB 2412741 A), Abstract, Pub. Date: Oct. 5, 2005.*
Ursin B., "Review of elastic and electromagnetic wave propagation in horizontally layered media," Geophysics, Society of Exploration Geophysicists, Tulsa, US, 48(8):1063-1081 (1983).
Amundsen L. et al., "Multiple attenuation and P/S splitting of multicomponent OBC data at a heterogeneous sea floor," Wave Motion Elsevier Netherlands, 32(1): 67-78 (2000).

(Continued)

*Primary Examiner*—John H Lee
(74) *Attorney, Agent, or Firm*—Patterson, Thuente, Skaar & Christensen, P.A.

(57) ABSTRACT

A method of analyzing an electromagnetic wavefield includes the steps of measuring the electric and magnetic fields at at least one receiver, formulating a respective spatial domain filter in respect of each of mutually orthogonal components of each of the electric and magnetic fields, and applying the filters to the measured acquired data to decompose the wavefield into upgoing and downgoing components.

17 Claims, 3 Drawing Sheets

OTHER PUBLICATIONS

Slob, "Wave field decomposition of full-polarimetric data based on the two-way wave equation," Grounds Penetrating Radar, Proceedings of the $10^{th}$ Int'l Conference on Delft, The Netherlands, Jun. 21-24, 2004, vol. 1 pp. 315-318 (Jun. 21, 2004).

Ursin, "Review of elastic and electromagnetic wave propagation in horizontally layered media," Geophysics, Society of Exploration Geophysicists, Tulsa, USA, vol. 48 (8):1065-1069 (Aug. 1, 1983).

Ellingsrud et al., "Remote sensing of hydrocarbon layers by seabed logging (SBL): Results from a cruise offshore Angola," Oct. 2002, The Leading Edge, pp. 972-982.

Eidesmo et al., "Sea Bed Logging (SBL), a new method for remote and direct identification of hydrocarbon filled layers in deepwater areas," Mar. 2002, first break, vol. 20.3, pp. 144-152.

Search Report, PCT/EP2005/052781, dated Aug. 30, 2005.

Search Report, GB 0414373.1, dated Octrber 14, 2004.

* cited by examiner

ELECTROMAGNETIC WAVEFIELD ANALYSIS

RELATED APPLICATIONS

This application claims priority to PCT Application No. PCT/EP2005/051484 filed Apr. 1, 2005, and Great Britain Application No. 0407696.4 filed Apr. 3, 2004, the disclosures of which are hereby incorporated by reference in their entireties.

FIELD OF THE INVENTION

The present invention relates to the analysis of an electromagnetic wavefield. In particular, the present invention is concerned with the decomposition of a wavefield into its constituent upgoing and downgoing components in the field of electromagnetic seabed logging.

BACKGROUND OF THE INVENTION

The electromagnetic seabed logging (EM-SBL) technique is a new hydrocarbon exploration tool based on electromagnetic data, and is disclosed in Eidesmo et al., (2002) "Sea Bed Logging, a new method for remote and direct identification of hydrocarbon filled layers in deepwater areas", The Leading Edge, 20, No. 3, 144-152 and in Ellingsrud et al., (2002) "Remote sensing of hydrocarbon layers by seabed logging SBL: Results from a cruise offshore Angola", First Break, 21, No. 10, 972-982. EM-SBL is a special application of controlled-source electromagnetic (CSEM) sounding. CSEM sounding has been used successfully for a number of years to study ocean basins and active spreading centres. SBL is the first application of CSEM for remote and direct detection of hydrocarbons in marine environments. The two first successful SBL surveys published were offshore West Africa (Eidesmo et al and Ellingsrud et al above) and offshore mid-Norway, Røsten et al., (2003) "A Seabed Logging Calibration Survey over the Ormen Lange gas field", EAGE, 65$^{th}$ An. Internat. Mtg., Eur. Assoc. Geosc. Eng., Extended Abstracts, P058. Both studies were carried out in deep water environments (greater than 1,000 meter water depth).

SUMMARY OF THE INVENTION

The method uses a horizontal electrical dipole (HED) source that emits a low frequency electromagnetic signal into the underlying seabed and downwards into the underlying sediments. Electromagnetic energy is rapidly attenuated in the conductive subsurface sediments due to water-filled pores. In high-resistance layers such as hydrocarbon-filled sandstones and at a critical angle of incidence, the energy is guided along the layers and attenuated to a lesser extent. Energy refracts back to the seabed and is detected by electromagnetic receivers positioned thereupon. When the source-receiver distance (i.e. the offset) is of the order of 2 to 5 times the depth of the reservoir, the refracted energy from the resistive layer will dominate over directly transmitted energy. The detection of this guided and refracted energy is the basis of EM-SBL.

The thickness of the hydrocarbon-filled reservoir should be at least 50 m to ensure efficient guiding along the high-resistance layer The electromagnetic energy that is generated by the source is spread in all directions and the electromagnetic energy is rapidly attenuated in conductive subset sediments. The distance to which the energy can penetrate into the subsurface is mainly determined by the strength and frequency of the initial signal, and by the conductivity of the underlying formation. Higher frequencies result in greater attenuation of the energy and hence a lower penetration depth. The frequencies adopted in EM-SBL are therefore very low, typically 0.25 Hz. The electric permittivity can be neglected due to the very low frequencies, and the magnetic permeability is assumed to be that of a vacuum, i.e. a non-magnetic subsurface.

In terms of numbers, a hydrocarbon-filled reservoir typically has a resistivity of a few tens of ohm-meters or more, whereas the resistivity of the over- and under-lying sediments is typically less than a few ohm-meters. The propagation speed is medium-dependent. In seawater, the speed is approximately 1,700 m/s (assuming a frequency of 1 Hz and a resistivity of 0.3 ohm-m), whereas a typical propagation speed of the electromagnetic field in water-filled subset sediments is about 3,200 m/s, assuming the same frequency and resistivity of around 1 ohm-m. The electromagnetic field in a high-resistance hydrocarbon-filled layer propagates at a speed of around 22,000 m/s (50 ohm-m resistivity and 1 Hz frequency). The electromagnetic skin depths for these three cases are approximately 275 m, 500 m and 3,600 m, respectively.

The electromagnetic receivers may be placed individually on the seabed, each receiver measuring two orthogonal horizontal components and one vertical component of each of the electric and magnetic fields. The HED source consists of two electrodes approximately 200 m apart, in electrical contact with the seawater. The source transmits a continuous and periodic alternating current signal, with a fundamental frequency in the range of 0.05-10 Hz. The peak-to-peak AC ranges from zero to several hundred amps. The height of the source relative to the seabed should be much less than the electromagnetic skin depth in seawater to ensure good coupling of the transmitted signal into the subsurface, e.g. around 50-100 m. There are several ways of positioning the receivers on the seabed. Usually, the receivers are placed in a straight line. Several such lines can be used in a survey and the lines can have any orientation with respect to each other.

Figure 1:
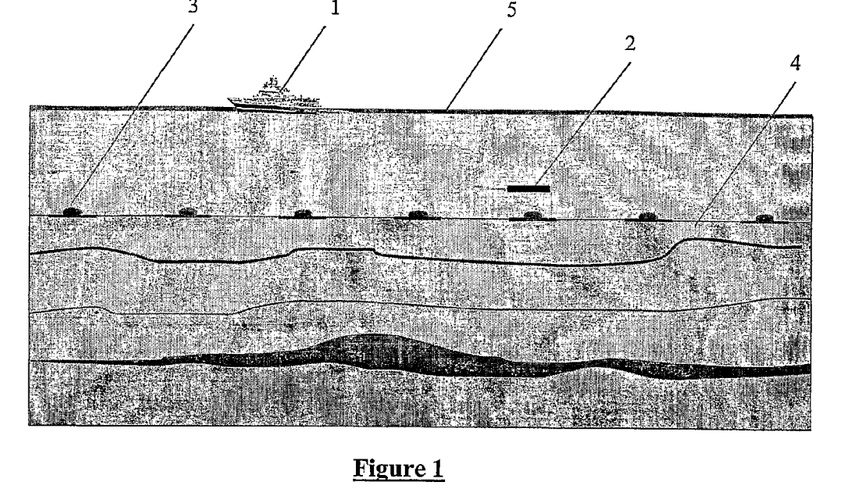
FIG. 1 illustrates the environment and apparatus for the acquisition of EM-SBL data.

The environment and apparatus for acquiring EM-SBL data are illustrated in FIG. 1. A survey vessel 1 tows the electromagnetic source 2 along and perpendicular to the lines of receivers 3, and both in-line (transverse magnetic) and broad-line (transverse electric) energy can be recorded by the receivers. The receivers on the seabed 4 record data continuously while the vessel tows the source at a speed of 1-2 knots. The EM-SBL data are densely sampled at the source side, typically sampled at 0.04s intervals. On the receiver side, typical receiver separation distance is approximately 200-2, 000 m. Standard processing and interpretation of the acquired data can be performed in the common receiver domain or in the common shot domain, as long as data are sampled according to sampling theorem (see, for example, Antia (1991) "Numerical methods for scientists and engineers", Tata McGraw-Hill Publ. Co. Limited, New Dehli).

The EM-SBL data are acquired as a time series and then processed using a windowed discrete Fourier series analysis (see, for example, Jacobsen and Lyons (2003) "The Sliding DFT", IEEE Signal Proc. Mag., 20, No. 2, 74-80) at the transmitted frequency, i.e. the fundamental frequency or a harmonic thereof. After processing, the data can be displayed as magnitude versus offset (MVO) or phase versus offset (PVO) responses.

Figure 2:
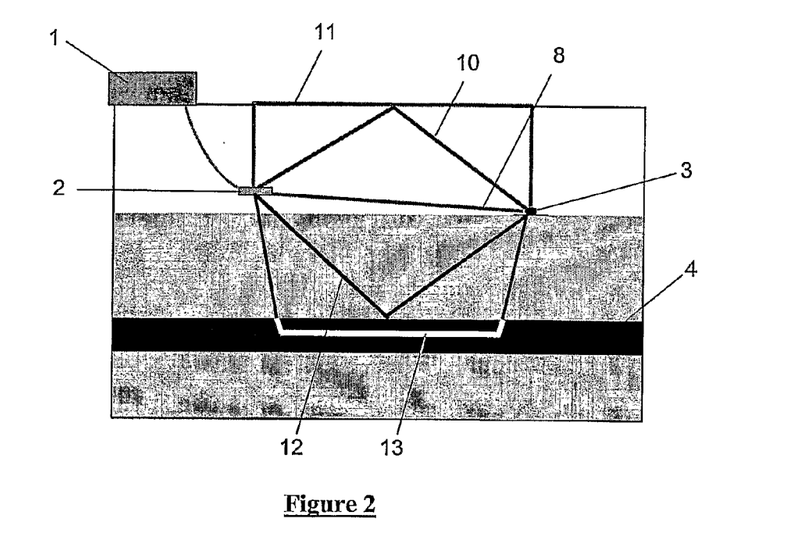
FIG. 2 illustrates the types of wave present in a typical EM-SBL environment.

The principal wave types in the EM-SBL survey are illustrated in FIG. 2. The wave types of main interest for hydrocarbon mapping involve only a single reflection 12 and a single refraction 13 at the target. These are detected as upgoing events by the receiver 3. A problem that arises in electromagnetic marine surveying is that electromagnetic energy may travel from the source 2 to the receiver 3 along many paths. The direct wave 8 is a signal transmitted directly from the source 2 to the receiver 3. The direct wave dominates in amplitude at short source-receiver separations, but is strongly damped at larger offsets since sea water has a high conductivity. In shallow water, EM-SBL exploration is complicated by source-excited waves received at the receiver array as downward-traveling waves which have been refracted (wave 11) and totally reflected (wave 10) off the sea surface. The air wave 11 is the signal that propagates upwards from the source to the sea surface, horizontally through the air, and back down through the water column to the receiver. Due to the extreme velocity contrast between water and air the critical angle for total reflection between sea water and air occurs at almost normal incidence. For angles of incidence greater than the critical angle, total reflection takes place, and the air volume acts as a perfect mirror for upgoing energy. The surface reflection 10 has its geometrical reflection approximately mid-way between the source and the receiver. In terms of signal strength at the receiver, the sea surface boundary is an efficient reflector at small to moderate offsets and an efficient refractor at larger offsets. The waves traveling downwards interfere with the upgoing waves from the subsurface.

Reflections and refractions from the sea surface represent a severe problem, particularly in shallow water electromagnetic exploration. If the sea surface reflections and refractions are not sufficiently attenuated, they will interfere and overlap with primary reflections and refractions from the subsurface. Optimal processing, analysis and interpretation of marine electromagnetic data requires full information about the wavefield so that the wavefield may be decomposed into its upgoing and downgoing components.

The following notation shall be adopted throughout the remainder of this specification:

| | |
|---|---|
| $E = E(x, \omega)$ | Electric field strength |
| $H = H(x, \omega)$ | Magnetic field strength |
| $J = H(x, \omega)$ | Volume density of electric current |
| $\sigma = \sigma(x)$ | Electric conductivity |
| $\mu = \mu(x)$ | Magnetic permeability |
| $\epsilon = \epsilon(x)$ | Electric permittivity |
| $\tilde{\epsilon} = \tilde{\epsilon}(x, \omega)$ | Complex electric permittivity $\tilde{\epsilon} = \epsilon\left(1 + \dfrac{i\sigma}{\omega\varepsilon}\right)$ |
| $\eta = \eta(x, \omega)$ | Transverse admittance per length of the medium, $\eta = \sigma - i\omega\epsilon = -i\omega\tilde{\epsilon}$ |
| $\zeta = \zeta(x, \omega)$ | Longitudinal impedance per length of the medium, $\zeta = -i\omega\mu$ |
| $c = c(x, \omega)$ | Complex velocity, $c^{-2} = \mu\tilde{\epsilon} = -\omega^{-2}\eta\zeta$ |

The wavenumber k, which characterizes the interaction of the electromagnetic field with the physical properties of the medium and frequency, is given by:

$$k = \omega/c = i(\eta\zeta)^{1/2} = \omega(\mu\tilde{\epsilon})^{1/2}.$$

The complex permittivity $\tilde{\epsilon}$ combines conduction currents and displacement currents. At very low frequencies, such as those used in EM-SBL, $\omega \ll \sigma/\epsilon$, and the field is said to be diffusive. To a good approximation, at low frequencies displacement currents are much smaller than conduction currents so that the complex permittivity can be approximated by $\tilde{\epsilon} = i\sigma/\omega$, i.e. the complex permittivity depends on the electric conductivity, and not on the electric permittivity. The magnetic permeability $\mu$ is set to that of free-space, $\mu = \mu_0 = 4\pi \cdot 10^{-7}$ H/m, which is representative of a non-magnetic water layer and seabed. During EM-SBL analysis, the wavenumber k can be written as $k = (i\omega\mu_0\sigma)^{1/2}$ and the complex velocity can be written as $c = (\omega/(\mu_0\sigma))^{1/2} e^{-i\pi/4}$. The longitudinal impedance per length is $\zeta = -i\omega\mu_0$. The transverse admittance per length of the medium is $\eta = \sigma$.

It is preferable to be able to decompose the wavefield using data obtained during a standard electromagnetic survey. The problem can then be cast as that of predicting from measurements at the seabed the downgoing wavefield at any point just above or just below the seabed. The upgoing electromagnetic field is then the difference between the electromagnetic field itself and its downgoing component, as given by the equation $$E = E^{(U)} + E^{(D)}; H = H^{(U)} + H^{(D)}.$$

where the U and D superscript indicate the upgoing and downgoing components, respectively of the electric field E and magnetic field H.

It is known to use plane wave decomposition analysis as described in B. Ursin, Review of Elastic Electromagnetic Wave Propagation in Layered Media, Geophysics, 48, 1063-1081, 1983 and Amundsen et al., Wavefield Decomposition of Electromagnetic Waves into Upgoing and Downgoing Components, Geophysics, submitted. These approaches use only linear combinations of the horizontal electromagnetic components transformed into the horizontal wavenumber or slowness domain.

According to a first aspect of the invention, there is provided a method as defined in the appended claim 1.

Further aspects and embodiments of the invention are defined in the other appended claims.

It is thus possible to provide a technique which permits improved and general decomposition of the electromagnetic wavefield into its upgoing and downgoing components.

BRIEF DESCRIPTION OF THE DRAWINGS

For a better understanding of the present invention and in order to show how the same may be carried into effect, preferred embodiments of the invention will now be described, by way of example, with reference to the accompanying drawings in which.

DETAILED DESCRIPTION OF THE DRAWINGS

The technique described herein provides decomposition of an electromagnetic wavefield into its upgoing and downgoing components through application of spatially-dependent convolution filters to the electric and magnetic fields. The spatial convolution filters are determined from the representation theorem using data acquired from electric and magnetic sensors.

Measurements of both the electric and magnetic fields are combined in the spatial domain to attenuate downgoing electric and magnetic waves after application of appropriate spatially-dependent decomposition filters, obtained using the electromagnetic representation theorem. This approach includes all possible linear combinations of the electric and magnetic field components, not limited to only the horizontal components.

Alternatively, measurements of both the electric and magnetic fields can be combined in the frequency, wavenumber or slowness domain to attenuate downgoing electric and magnetic waves after application of appropriate frequency, wavenumber or slowness-dependent decomposition scalars, where the scalars are the Fourier transform of the above spatially-dependent decomposition filters. The scalars for the frequency, wavenumber or slowness domains may be combined. This approach includes all possible linear combinations of the electric and magnetic field components and is not limited to only the horizontal components.

An advantage of expressing the up/down decomposition of EM-SBL recordings in terms of the horizontal components of the EM field is that the horizontal components are continuous across the seabed interface. The up/down decomposition can therefore be effected both above and below the seabed by using the corresponding medium parameters (complex velocity and electric conductivity of sea-water or seabed, respectively).

In the case where up/down decomposition is effected using both horizontal and vertical components, the possible discontinuity in the vertical component of the electric field at the seabed must be taken into account. Assuming a non-magnetic seabed, the vertical component of the magnetic field can be regarded as continuous. Otherwise, when the electric conductivity is known at the sensor locations from direct or indirect measurements, the discontinuity of the vertical electric field can be predicted. Generally, the discontinuity step equals the ratio of the complex electric permittivity in sea-water and that in the seabed. For EM-SBL data, to a good approximation the discontinuity step equals the ratio of electric conductivity in sea-water and that in the seabed. Therefore, when the vertical electric component is measured just above the seabed, its component just below the seabed can be estimated from the measurement above and the predicted discontinuity step. Similarly, the vertical electric component above the seabed can be estimated from the vertical electric component measured below the seabed. Under these circumstances, up/down decomposition can readily be effected just above and just below the seabed by processing the measured horizontal components together with measured or estimated vertical components of the electromagnetic field.

The representation theorem is used to derive an up/down decomposition algorithm in the frequency-space domain. By Fourier transforming this solution over horizontal coordinates, the corresponding algorithm in the frequency-horizontal wavenumber domain may be obtained. By denoting X as one of the fields $\{E_1, E_2, E_3, H_1, H_2, H_3\}$ it is possible to resolve the upgoing wavefield by applying spatially-dependent convolution filters $F_{E_j}^X$ and $F_{H_j}^X$ to the electric and magnetic fields in accordance with the following equation:

$$X^{(U)}(x, \omega) = \sum_{j=1}^{3} (F_{E_j}^X(x, \omega) * E_j(x, \omega) + F_{H_j}^X(x, \omega) * H_j(x, \omega)),$$

where x is a location expressed in a Cartesian coordinate system, $\omega$ is the angular frequency and * denotes spatial convolution over the horizontal coordinates $x_1$ and $x_2$. In the horizontal wavenumber $(k_1, k_2)$ or horizontal slowness $(p_1, p_2)$ domain, spatial convolution between the quantities corresponds to multiplication between the Fourier transformed quantities. When $\tilde{X}$ represents one of the transformed fields $\{\tilde{E}_1, \tilde{E}_2, \tilde{E}_3, \tilde{H}_1, \tilde{H}_2, \tilde{H}_3\}$ the upgoing wavefield may be decomposed by application of decomposition scalars $\tilde{F}_{E_j}^X$ and $\tilde{F}_{H_j}^X$ to the electric and magnetic fields in accordance with:

$$\tilde{X}^{(U)} = \sum_{j=1}^{3} (\tilde{F}_{E_j}^X \cdot \tilde{E}_j + \tilde{F}_{H_j}^X \cdot \tilde{H}_j).$$

The decomposition scalars $\tilde{F}_{E_j}^X$ and $\tilde{F}_{H_j}^X$ are the Fourier transforms of the spatial convolution filters $\tilde{F}_{E_j}^X$ and $\tilde{F}_{H_j}^X$, respectively.

Both the electric and magnetic fields obey Maxwell's equations which can be expressed in the frequency domain as:

$$\nabla \times H(x,\omega) - \eta(x,\omega)E(x,\omega) = J(x,\omega),$$

$$\nabla \times E(x,\omega) + \zeta(x,\omega)H(x,\omega) = 0.$$

In a source-free and charge-free homogeneous region, the electromagnetic field satisfies the vector Helmholtz equation, which may be expressed as:

$$(\nabla^2 + k^2)E = 0$$

$$(\nabla^2 + k^2)H = 0.,$$

which may be re-expressed as:

$$(\nabla^2 + k^2)A = 0;$$

$$(\nabla^2 + k^2)\phi = 0,$$

provided that the following conditions are satisfied:

$$H = \frac{1}{\mu}\nabla \times A;$$

$$E = i\omega A - \nabla \phi,$$

$$\nabla \cdot A - \frac{i\omega}{c^2}\phi = 0,$$

the last of these being recognised as the Lorentz gauge condition.

Representation Theorem

The integral representation used to derive the convolution filters can be obtained by integrating Maxwell's equations by the Green's function technique, although other techniques are known. The representation theorem provides a solution for a wavefield inside a volume V obtained from measurements of the wavefield on the surface S bounding the volume. It is assumed that there are no sources within the volume V and that n is the inward-pointing normal vector to the surface. A causal Green's function which satisfies the Helmholtz equation is given by:

$$(\nabla^2 + k^2)G(x,x',\omega) = -\delta(x-x')$$

where the location x' lies within the volume V. The Green's function G obeys the rules of reciprocity. It can be shown that the electric wavefield at the point x' is given by:

$$E(x') = \int dS(x)[(n \times E(x)) \times \nabla G(x,x') + (n \cdot E(x))\nabla G(x,x') - \zeta(x)(n \times H(x))G(x,x')]. \quad [1]$$

The surface integral given in Equation 1 may be evaluated over a closed surface to derive an up/down decomposition algorithm. This may be achieved using only limited measurements of the wavefield on the receiver plane or line of receivers. On the surface S any convenient boundary conditions may be imposed on the Green's function, independent of the actual physical conditions. For convenience, the outgoing boundary conditions on S are those of the Green's function, so that S is transparent to the Green's function. The Green's function may be a scalar Green's function or a tensor Green's function.

Space-Domain Upgoing Electric Field

Figure 3:
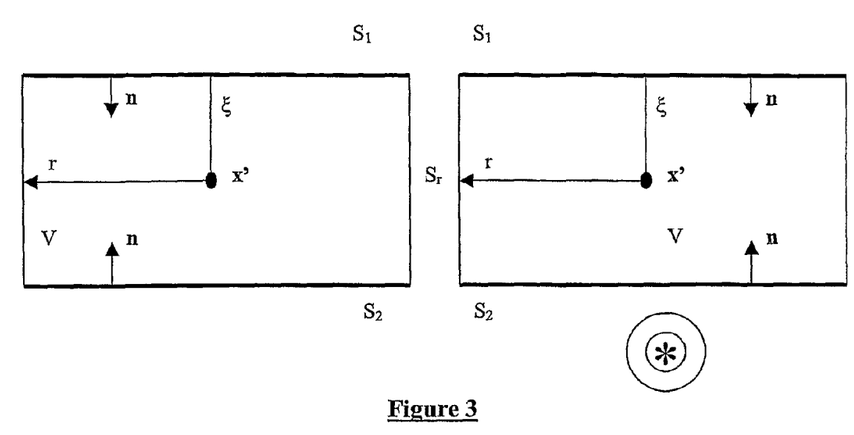
FIG. 3 illustrates the geometry of the method of an embodiment of the present invention.

To obtain the space-domain upgoing electric field using the representation theorem, the closed surface S is divided into three surfaces: $S_1$ representing the plane of the receivers, $S_2$ representing a plane lying below and parallel to $S_1$, and the surface $S_r$, normal to both $S_1$ and $S_2$. This geometry is illustrated in FIG. 3. The surface integral over S provided in Equation 1 can therefore be re-written as three separate surface integrals over $S_1$, $S_2$ and $S_r$. The surface $S_r$ is characterised by a radius r. The surface $S_2$ is set to be infinitesimally close to $S_1$. The radius r is allowed to tend to infinity, so that the surface integral over $S_r$ vanishes. Equation 1 may now be re-written as integrals over surfaces $S_1$ and $S_2$ only:

$$E(x') = \int_{S_1+S_2} dS(x)[(n \times E(x)) \times \nabla G(x,x') + (n \cdot E(x)) \nabla G(x,x') - \zeta(x)(n \times H(x)) G(x,x')]. \quad [2]$$

The surface integrals of Equation 2 may be considered as filters for waves passing across each respective surface. For the surface $S_1$, downgoing waves (i.e. those waves from electromagnetic sources above $S_1$) are passed by the integral over $S_1$, whilst upgoing waves are filtered out. Similarly, for the surface $S_2$, upgoing waves (i.e. those from sources below $S_2$) are passed by the integral over $S_2$ whilst downgoing waves are filtered out. The surface integral over $S_1$ therefore gives the downgoing field at x' whilst the surface integral over $S_2$ gives the upgoing wavefield at x'.

The physical measurements taken during the survey comprise the total wavefield, and the downgoing component of this wavefield can now be computed from Equation 2 by limiting the integral over the receiver plane $S_1$. Decomposition of E amounts to evaluating the representation theorem over surface $S_1$ at locations x' infinitesimally below $S_1$. A point $x = (x_1, x_2, x_3)$ on the measurement plane and a point $x' = (x'_1, x'_2, x'_3)$ just below the measurement plane are sufficiently vertically proximate that $x'_3 - x_3 = \xi \to 0^+$ for a positive downwards $x_3$ axis.

Due to the choice of outgoing boundary conditions for the Green's function, the Green's function from x' to x on $S_1$ will be the Green's function for free space which is given in three dimensions by:

$$G^{(3D)}(R) = \frac{1}{4\pi R} \exp(ikR),$$

and in two dimensions by:

$$G^{(2D)}(R) = \frac{i}{4} H_0^{(1)}(kR),$$

where $R = |x - x'|$, and $H_0^{(1)}$ is the Hankel function of first kind and order zero.

Based upon the available data, the up/down decomposition can be effected at different locations. By choosing the complex velocity and complex electric permittivity equal to the parameters in water, the decomposition can be carried out just above the seabed. By choosing the complex velocity and complex electric permittivity equal to those of the material of the seabed, up/down decomposition can be effected below the seabed. It is generally easier to obtain the data for seawater rather than having to determine the material parameters of the seabed, but it is preferable to effect the decomposition just below the seabed.

Using Equation 2 and the fact that the total electric wavefield can be decomposed into upgoing and downgoing components, the upgoing electric field is given by $$E^{(U)}(x') = E(x') - \int_{S_1} dS(x)[(n \times E(x)) \times \nabla G(x,x') + (n \cdot E(x)) \nabla G(x,x') - \zeta(x)(n \times H(x)) G(x,x')]. \quad [3]$$

The integral over the surface $S_1$ reduces to a two-dimensional spatial convolution. The Green's function is shift invariant with respect to spatial coordinates $x_1$ and $x_2$. Due to the choice of Green's function such that $\nabla G = -\nabla'G$, and that $$\partial'_3 G = -\frac{1}{2}\delta(x_1 - x'_1)\delta(x_2 - x'_2); \; x'_3 - x_3 = \xi \to 0+,$$

Equation 3 may be written in component form as $$E_1^{(U)}(x) = \frac{1}{2}E_1(x) + E_3(x) * \partial_1 G(x) - \zeta H_2(x) * G(x), \quad [4a]$$

$$E_2^{(U)}(x) = \frac{1}{2}E_2(x) + E_3(x) * \partial_2 G(x) + \zeta H_1(x) * G(x), \quad [4b]$$

$$E_3^{(U)}(x) = \frac{1}{2}E_3(x) - E_1(x) * \partial_1 G(x) - E_2(x) * \partial_2 G(x), \quad [4c]$$

where $G(x) = G(x,0)$. Equations 4a to 4c depend on the vertical component $E_3$ of the electric field. If the sensors used in the physical survey do not measure the vertical component of the electric field, $E_3$ may be eliminated using Maxwell's equations in order to express the upgoing wavefield in terms of the horizontal field component on the measurement plane only:

$$E_1^{(U)}(x) = \frac{1}{2}E_1(x) + (i\omega\tilde{\varepsilon})^{-1}[H_1(x) * \partial_1 \partial_2 G(x) - H_2(x) * (\partial_1^2 + k^2)G(x)], \quad [5a]$$

$$E_2^{(U)}(x) = \frac{1}{2}E_2(x) + (i\omega\tilde{\varepsilon})^{-1}[H_2(x) * \partial_1 \partial_2 G(x) - H_1(x) * (\partial_2^2 + k^2)G(x)], \quad [5b]$$

$$E_3^{(U)}(x) = -E_1(x) * \partial_1 G(x) - E_2(x) * \partial_2 G(x) + (2i\omega\tilde{\varepsilon})^{-1}[\partial_2 H_1(x) - \partial_1 H_2(x)]. \quad [5c]$$

The upgoing electric wavefields provided by Equations 4a to 4c and 5a to 5c do not contain any downgoing reflections or refractions caused by the sea surface or the incident wavefield due to the source since the receivers lie beneath the source. The sea surface reflections and refractions and the incident source wavefield are fully contained within the downgoing part of the wavefield. The majority of the magnetotelluric noise which may be present during the physical survey will also be contained within the downgoing component. Only the much weaker reflected magnetotelluric wavefield will still be present in the upgoing wavefield. The above equations for the upgoing electric wavefield are valid for a three dimensional inhomogeneous earth.

Space-Domain Upgoing Magnetic Field

The corresponding upgoing magnetic field may be easily determined from Equations 4a to 4c or 5a to 5c using the Maxwell relationship:

$$H^{(U)} = -\zeta^{-1} \nabla \times E^{(U)},$$
yielding $$H_1^{(U)}(x) = \frac{1}{2} H_1(x) + H_3(x) * \partial_1 G(x) + \eta E_2(x) * G(x), \quad [6a]$$

$$H_2^{(U)}(x) + \frac{1}{2} H_2(x) + H_3(x) * \partial_2 G(x) - \eta E_1(x) * G(x), \quad [6b]$$

$$H_3^{(U)}(x) = \frac{1}{2} H_3(x) - H_1(x) * \partial_1 G(x) - H_2(x) * \partial_2 G(x). \quad [6c]$$

Equations 6a to 6c depend on the vertical component $H_3$ of the magnetic field. As similarly discussed in the case of the electric wavefield, should the sensors not have recorded the vertical component during the physical survey, $H_3$ may be eliminated using Maxwell's relationship $$H_3 = -(i\omega\mu)^{-1}(\partial_2 E_1 - \partial_1 E_2),$$
to give $$H_1^{(U)}(x) = \frac{1}{2} H_1(x) - (i\omega\mu)^{-1} [E_1(x) * \partial_1 \partial_2 G(x) - E_2(x) * (\partial_1^2 + k^2) G(x)], \quad [7a]$$

$$H_2^{(U)}(x) = \frac{1}{2} H_2(x) + (i\omega\mu)^{-1} [E_2(x) * \partial_1 \partial_2 G(x) - E_1(x) * (\partial_2^2 + k^2) G(x)], \quad [7b]$$

$$H_3^{(U)}(x) = -H_1(x) * \partial_1 G(x) - H_2(x) * \partial_2 G(x) - (2i\omega\mu)^{-1} [\partial_2 E_1(x) - \partial_1 E_2(x)]. \quad [7c]$$

As before, Equations 6a to 6c and 7a to 7c do not contain downgoing signals related to the source, the sea surface, or any magnetotelluric noise.

As described above, the upgoing electric and magnetic wavefields may be described using the following notation $$X^{(U)}(x, \omega) = \sum_{j=1}^{3} \left( F_{E_j}^X(x, \omega) * E_j(x, \omega) + F_H^X(x, \omega) * H_j(x, \omega) \right).$$

Equations 4 and 6 can therefore be used to provide expressions for the spatial convolution filters as provided in the following Table 1.

TABLE 1

| X | $F_{E_1}^X$ | $F_{E_2}^X$ | $F_{E_3}^X$ | $F_{H_1}^X$ | $F_{H_2}^X$ | $F_{H_3}^X$ |
|---|---|---|---|---|---|---|
| $E_1$ | $\frac{1}{2}\delta(x)$ | 0 | $\partial_1 G(x)$ | 0 | $-\zeta G(x)$ | 0 |
| $E_2$ | 0 | $\frac{1}{2}\delta(x)$ | $\partial_2 G(x)$ | $\zeta G(x)$ | 0 | 0 |
| $E_3$ | $-\partial_1 G(x)$ | $-\partial_2 G(x)$ | $\frac{1}{2}\delta(x)$ | 0 | 0 | 0 |
| $H_1$ | 0 | $\eta G(x)$ | 0 | $\frac{1}{2}\delta(x)$ | 0 | $\partial_1 G(x)$ |
| $H_2$ | $-\eta G(x)$ | 0 | 0 | 0 | $\frac{1}{2}\delta(x)$ | $\partial_2 G(x)$ |
| $H_3$ | 0 | 0 | 0 | $-\partial_1 G(x)$ | $-\partial_2 G(X)$ | $\frac{1}{2}\delta(x)$ |

An alternative set of filters, following from Equations 5 and 7, is provided in Table 2.

TABLE 2

| X | $F_{E_1}^X$ | $F_{E_2}^X$ | $F_{E_3}^X$ | $F_{H_1}^X$ | $F_{H_3}^X$ | $F_{H_3}^X$ |
|---|---|---|---|---|---|---|
| $E_1$ | $\frac{1}{2}\delta(x)$ | 0 | 0 | $e\partial_1\partial_2 G(x)$ | $-e(\partial_1^2 + k^2)G(x)$ | 0 |
| $E_2$ | 0 | $\frac{1}{2}\delta(x)$ | 0 | $e(\partial_2^2 + k^2)G(x)$ | $-e\partial_1\partial_2 G(x)$ | 0 |
| $E_3$ | $-\partial_1 G(x)$ | $-\partial_2 G(x)$ | 0 | $\frac{e}{2}\partial_2 \delta(x)$ | $-\frac{e}{2}\partial_1 \delta(x)$ | 0 |
| $H_1$ | $-m\partial_1\partial_2 G(x)$ | $m(\partial_1^2 + k^2)G(x)$ | 0 | $\frac{1}{2}\delta(x)$ | 0 | 0 |
| $H_2$ | $-m(\partial_2^2 + k^2)G(x)$ | $m\partial_1\partial_2 G(x)$ | 0 | 0 | $\frac{1}{2}\delta(x)$ | 0 |
| $H_3$ | $-\frac{m}{2}\partial_2 \delta(x)$ | $\frac{m}{2}\partial_1 \delta(x)$ | 0 | $-\partial_1 G(x)$ | $-\partial_2 G(x)$ | 0 |

Where $\delta(x)$ is the 2D Dirac delta function, and $m=(i\omega\mu)^{-1}$ $e=(i\omega\tilde{\varepsilon})^{-1}.$ The upgoing electromagnetic fields may also be considered in the wave number domain which require the introduction of the following notation:

$k_1$: horizontal wavenumber conjugate to $x_1$,
$k_2$: horizontal wavenumber conjugate to $x_2$,
$p_1$: horizontal slowness, $p_1=k_1/\omega$,
$p_2$: horizontal slowness, $p_2=k_2/\omega$,
p: radial slowness, $p^2=p_1^2+p_2^2$,
$q, q_1, q_2$: vertical slowness, $q=\sqrt{c^{-2}-p_1^2-p_2^2}, q_1=\sqrt{c^{-2}-p_1^2}$,
$q_2=\sqrt{c^{-2}-p_2^2}.$ Convolution in the spatial domain corresponds to multiplication in the wavenumber domain. Equations 4a to 4c may be transformed to the slowness domain to obtain for the upgoing electric field;

$$\tilde{E}_1^{(U)} = \frac{1}{2}\left[\tilde{E}_1 - \frac{p_1}{q}\tilde{E}_3 - \frac{\mu}{q}\tilde{H}_2\right],$$ [8a]

$$\tilde{E}_2^{(U)} = \frac{1}{2}\left[\tilde{E}_2 - \frac{p_2}{q}\tilde{E}_3 + \frac{\mu}{q}\tilde{H}_1\right],$$ [8b]

$$\tilde{E}_3^{(U)} = \frac{1}{2}\left[\tilde{E}_3 + \frac{1}{q}(p_1\tilde{E}_1 + p_2\tilde{E}_2)\right].$$ [8c]

or alternatively Equations 5a to 5c may be transformed into the wavenumber domain if the vertical components of the wavefields have not been measured, giving for the upgoing electric field;

$$\tilde{E}_1^{(U)} = \frac{1}{2}\left[\tilde{E}_1 - \frac{1}{\tilde{\varepsilon}q}(p_1 p_2 \tilde{H}_1 + q_1^2 \tilde{H}_2)\right],$$ [9a]

$$\tilde{E}_2^{(U)} = \frac{1}{2}\left[\tilde{E}_2 + \frac{1}{\tilde{\varepsilon}q}(p_1 p_2 \tilde{H}_2 + q_2^2 \tilde{H}_1)\right],$$ [9b]

$$E_3^{(u)} = \frac{1}{2}\left[\frac{1}{\tilde{\varepsilon}}(p_2\tilde{H}_1 - p_1\tilde{H}_2) + \frac{1}{q}(p_1\tilde{E}_1 + p_2\tilde{E}_2)\right].$$ [9c]

Similarly, Equations 6a to 6c may be transformed into the wavenumber domain to obtain for the upgoing magnetic field:

$$\tilde{H}_1^{(U)} = \frac{1}{2}\left[\tilde{H}_1 - \frac{p_1}{q}\tilde{H}_3 + \frac{\tilde{\varepsilon}}{q}\tilde{E}_2\right],$$ [10a]

$$\tilde{H}_2^{(U)} = \frac{1}{2}\left[\tilde{H}_2 - \frac{p_2}{q}\tilde{H}_3 + \frac{\tilde{\varepsilon}}{q}\tilde{E}_1\right],$$ [10b]

$$\tilde{H}_3^{(U)} = \frac{1}{2}\left[\tilde{H}_3 + \frac{1}{q}(p_1\tilde{H}_1 + p_2\tilde{H}_2)\right].$$ [10c]

Transforming Equations 7a to 7c into the wavenumber domain yields alternate expressions for the upgoing magnetic field which do not depend on the vertical components:

$$\tilde{H}_1^{(U)} = \frac{1}{2}\left[\tilde{H}_1 + \frac{1}{\mu q}(p_1 p_2 \tilde{E}_1 + q_1^2 \tilde{E}_2)\right],$$ [11a]

$$\tilde{H}_2^{(U)} = \frac{1}{2}\left[\tilde{H}_2 - \frac{1}{\mu q}p_1 p_2 \tilde{E}_2 + q_2^2 \tilde{E}_1\right],$$ [11b]

$$\tilde{H}_3^{(U)} = \frac{1}{2}\left[\frac{1}{q}(p_1\tilde{H}_1 + p_2\tilde{H}_2) - \frac{1}{\mu}(p_2\tilde{E}_1 - p_1\tilde{E}_2)\right].$$ [11c]

The scalars in front of the transformed electric and magnetic field components in Equations 8 to 11 are known as decomposition scalars, and two possible sets of values are given in Tables 3 and 4 below.

TABLE 3

| X | $\ddot{F}_{E_1}{}^X$ | $\ddot{F}_{E_2}{}^X$ | $\ddot{F}_{E_3}{}^X$ | $\ddot{F}_{H_1}{}^X$ | $\ddot{F}_{H_2}{}^X$ | $\ddot{F}_{H_3}{}^X$ |
|---|---|---|---|---|---|---|
| $\ddot{E}_1$ | $\frac{1}{2}$ | 0 | $-\frac{p_1}{2q}$ | 0 | $-\frac{\mu}{2q}$ | 0 |
| $\ddot{E}_2$ | 0 | $\frac{1}{2}$ | $-\frac{p_2}{2q}$ | $\frac{\mu}{2q}$ | 0 | 0 |
| $\ddot{E}_3$ | $\frac{p_1}{2q}$ | $\frac{p_1}{2q}$ | $\frac{1}{2}$ | 0 | 0 | 0 |
| $\ddot{H}_1$ | 0 | $\frac{\tilde{\varepsilon}}{2q}$ | 0 | $\frac{1}{2}$ | 0 | $-\frac{p_1}{2q}$ |
| $\ddot{H}_2$ | $-\frac{\tilde{\varepsilon}}{2q}$ | 0 | 0 | 0 | $\frac{1}{2}$ | $-\frac{p_2}{2q}$ |
| $\ddot{H}_3$ | 0 | 0 | 0 | $\frac{p_1}{2q}$ | $\frac{p_2}{2q}$ | $\frac{1}{2}$ |

TABLE 4

| X | $\ddot{F}_{E_1}{}^X$ | $\ddot{F}_{E_2}{}^X$ | $\ddot{F}_{E_3}{}^X$ | $\ddot{F}_{H_1}{}^X$ | $\ddot{F}_{H_2}{}^X$ | $\ddot{F}_{H_3}{}^X$ |
|---|---|---|---|---|---|---|
| $\ddot{E}_1$ | $\frac{1}{2}$ | 0 | 0 | $-\frac{p_1 p_2}{2\tilde{\varepsilon}q}$ | $-\frac{q_1^2}{2\tilde{\varepsilon}q}$ | 0 |
| $\ddot{E}_2$ | 0 | $\frac{1}{2}$ | 0 | $\frac{q_2^2}{2\tilde{\varepsilon}q}$ | $\frac{p_1 p_2}{2\tilde{\varepsilon}q}$ | 0 |
| $\ddot{E}_3$ | $\frac{p_1}{2q}$ | $\frac{p_2}{2q}$ | 0 | $\frac{p_2}{2\tilde{\varepsilon}}$ | $-\frac{p_1}{2\tilde{\varepsilon}}$ | 0 |
| $\ddot{H}_1$ | $\frac{p_1 p_2}{2\mu q}$ | $\frac{q_1^2}{2\mu q}$ | 0 | $\frac{1}{2}$ | 0 | 0 |
| $\ddot{H}_2$ | $-\frac{q_2^2}{2\mu q}$ | $-\frac{p_1 p_2}{2\mu q}$ | 0 | 0 | $\frac{1}{2}$ | 0 |
| $\ddot{H}_3$ | $-\frac{p_2}{2\mu}$ | $\frac{p_1}{2\mu}$ | 0 | $\frac{p_1}{2q}$ | $\frac{p_2}{2q}$ | 0 |

The decomposition scalars of Tables 3 and 4 can be used to describe the upgoing wavefield in the slowness domain as:

$$\tilde{X}^{(U)} = \sum_{j=1}^{3} (\tilde{F}_{E_j}^X \cdot \tilde{E}_j + \tilde{F}_{H_j}^X \cdot \tilde{H}_j).$$

The decomposition scalars are the spatial Fourier transform of the spatial convolution filters.

The spatial convolution filters and decomposition scalars may be determined analytically using the above described techniques for all three components of the wavefield, as well as the potentials;

$$A = A^{(U)} + A^{(D)}; \phi = \phi^{(U)} + \phi^{(D)}.$$

There is much freedom in the choice of potential, the definition of the potential depending on the chosen gauge. The Lorentz gauge used herein is only exemplary. Explicit decomposition filters or decomposition scalars for the potentials are therefore not provided herein.

Figure 4:
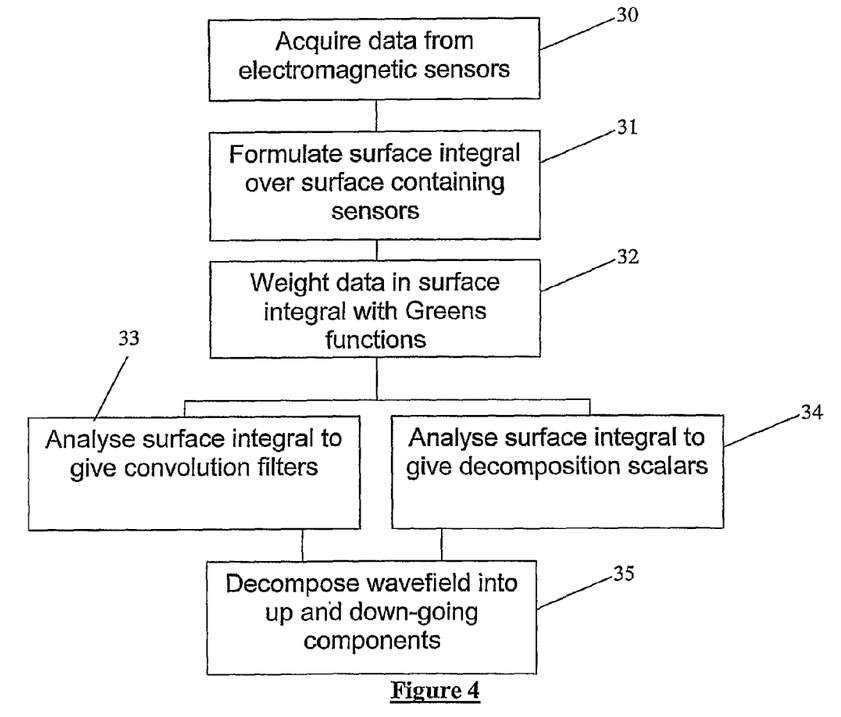
FIG. 4 is a flow diagram illustrating a method in accordance with an embodiment of the present invention.

The flow chart of FIG. 4 illustrates a technique for evaluating the convolution filters and decomposition scalars in accordance with an embodiment of the present invention. Initially, electromagnetic data is acquired at the sensors (step 30). A surface integral over the recorded data is formulated (step 31), the data being weighted by scalars and the Green's function for free space (step 32) Analysis can then be undertaken to obtain either the spatial domain convolution filters (step 33) or the frequency domain decomposition scalars (step 34), either set of filters being applied to the measured data to decompose the wavefield into upgoing and downgoing components (step 35).

Figure 5:
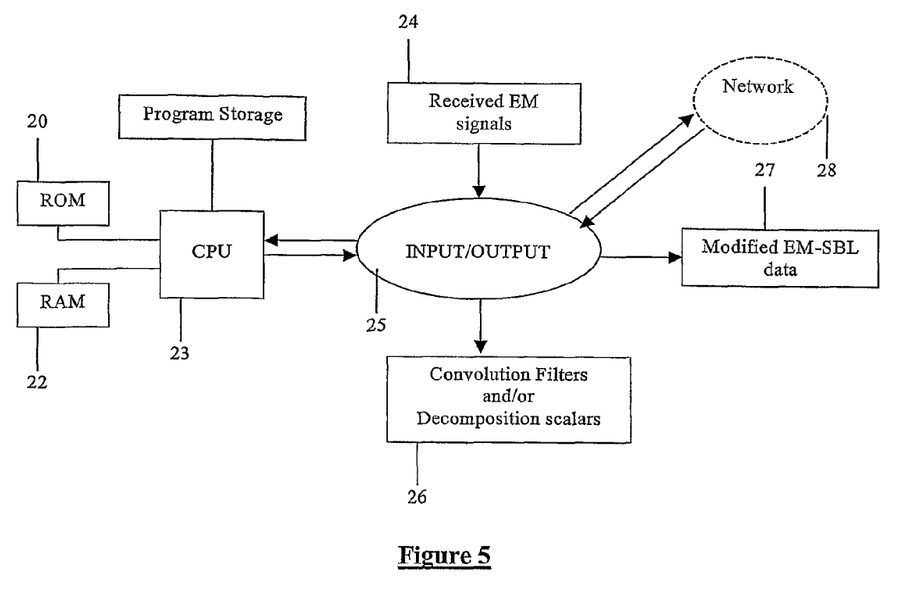
FIG. 5 is a block schematic diagram of an apparatus for performing the method of an embodiment of the present invention.

The schematic diagram of FIG. 5 illustrates a central processing unit (CPU) 23 connected to a read-only memory (ROM) 20 and a random access memory (RAM) 22. The CPU is provided with data 24 from the receivers via an input/output mechanism 25.

The CPU then determines the convolution filters and decomposition scalars 26 in accordance with the instructions provided by the program storage 21 (which may be a part of the ROM 20). The program itself, or any of the input and/or outputs to the system may be provided or transmitted to/from a communications network 28, which may be, for example, the Internet. The same system, or a separate system, may be used to modify the acquired data to remove the downgoing wavefield from the recorded data, resulting in modified marine data 27 which may be further processed. This technique is of particular importance in electromagnetic seabed logging environments where it is desired to remove the downgoing wavefield due to the source and reflections or refractions from the sea surface.

It will be appreciated by the skilled person that various modifications may be made to the above embodiments without departing from the scope of the present invention, as defined in the appended claims.

The invention claimed is:

1. A method of analyzing an electromagnetic wavefield, the method comprising the steps of:
    measuring the electric and magnetic fields at at least one receiver; and
    utilizing a computer to:
        formulate a respective spatial domain filter for each of mutually orthogonal components of each of the electric and magnetic fields; and
        apply the filters to measured data to decompose the wavefield into upgoing and downgoing components.

2. The method of claim 1, wherein the spatial domain filters are spatial domain convolution filters.

3. The method of claim 1, wherein the filters are formulated using three mutually orthogonal components of each of the electric and magnetic fields, respectively.

4. The method of claim 1, wherein the filters are formulated using an electromagnetic representation thereon.

5. The method of claim 4, wherein a surface integral over a surface containing the at least one receiver is used to formulate the filters.

6. The method of claim 5, wherein data in the surface integral is weighted by a scalar Green's function.

7. The method of claim 6, wherein the Green's function is a free-space Green's function.

8. The method of claim 5, wherein data in the surface integral is weighted by a tensor Green's function.

9. The method of claim 8, wherein data in the surface integral is weighted by a scalar Green's function and the Green's function is a free-space Green's function.

10. The method of claim 1, wherein the method is applied to electromagnetic seabed logging data and magnetotelluric measurements.

11. Use of the decomposed wavefield as determined in accordance with the method of claim 1 for processing electromagnetic data.

12. A program on a computer-readable medium for controlling a computer to perform the method of claim 1.

13. The program of claim 12, wherein the program is stored on a storage medium.

14. Transmission of the program of claim 12 across a communication network.

15. A computer program embodied on a computer-readable medium to perform the method of claim 1.

16. The method of claim 1, further comprising combining two or more of the mutually orthogonal components.

17. An apparatus for analyzing an electromagnetic wavefield, the apparatus comprising:
    at least one receiver for measuring electric and magnetic fields; and
    a computer configured to:
        formulate a respective spatial domain filter for each of mutually orthogonal components of each of the electric and magnetic fields; and
        apply the filters to measured data to decompose the wavefield into upgoing and downgoing components.

* * * * *